United States Patent [19]

Hirata

[11] 4,296,367

[45] Oct. 20, 1981

[54] SPEED CONTROL METHOD FOR AC MOTORS AND AN APPARATUS FOR THE CONTROL

[75] Inventor: Akio Hirata, Fuchu, Japan

[73] Assignee: Tokyo Shibaura Denki Kabushiki Kaisha, Kawasaki, Japan

[21] Appl. No.: 952,385

[22] Filed: Oct. 18, 1978

[30] Foreign Application Priority Data

Oct. 18, 1977 [JP] Japan .................................. 52-124887
Oct. 18, 1977 [JP] Japan .................................. 52-124888

[51] Int. Cl.$^3$ .......................... H02P 5/28; H02P 3/18; H02P 5/34; H02P 5/36
[52] U.S. Cl. .................................... 318/808; 318/812
[58] Field of Search ................................ 318/798–801, 318/802–803, 805, 807, 809–812, 808

[56] References Cited

U.S. PATENT DOCUMENTS

| | | | |
|---|---|---|---|
| 3,671,831 | 6/1972 | Chausse et al. | 318/800 |
| 3,919,609 | 11/1975 | Klautschek et al. | 318/803 |
| 3,967,173 | 6/1976 | Stich | 318/811 |
| 4,023,083 | 5/1977 | Plunkett | 318/810 |

Primary Examiner—J. V. Truhe
Assistant Examiner—John B. Conklin
Attorney, Agent, or Firm—Oblon, Fisher, Spivak, McClelland & Maier

[57] ABSTRACT

A frequency converter applies a variable voltage with a variable frequency to an AC motor coupled with a load. At least one frequency region is set up for the variable frequency. The ratio of a percentage input voltage expressed in terms of a percentage of the rated input voltage of the AC motor, to a corresponding percentage input frequency expressed in terms of a percentage of the rated input frequency of the AC motor, is set less than 1 within the frequency region thus set. Also an apparatus for the AC motor control provided.

7 Claims, 12 Drawings

SPEED CONTROL METHOD FOR AC MOTORS AND AN APPARATUS FOR THE CONTROL

The present invention relates to a speed control method for an AC motor for controlling the speed of the AC motor by controlling the input frequency of the AC motor and to an apparatus for the control.

The number n of rotation of the AC motor such as synchronous motors or induction motors is given by $n = 120f_1/p$ (rpm) where $f_1$ is the input frequency of the motor, and P is the number of poles. As well known, the number n of rotation may properly be controlled by adjusting the input frequency $f_1$. For a better understanding of the invention, conventional speed control method for an AC motor will be given with reference to FIGS. 1 and 2. A frequency converter 12 receives a power with a commercial frequency from a power source 11 and produces a variable voltage $V_{11}$ with a variable frequency. The variable voltage $V_{11}$ is applied to an AC motor 13 coupled with a load 15 by way of a coupling device 14. The amplitude and frequency of the voltage $V_{11}$ are changed by adjusting means (not shown). In FIG. 2, a percentage input frequency $f_1$ (%) to the AC motor 13 is plotted along the X-axis. A percentage input voltage $V_{11}$ (%) is plotted along the Y-axis on the left side of the graph and a percentage torque T developed by the AC motor 13 is plotted along another Y-axis on the right side. "100" on the X-axis represents the rated frequency of the AC motor. "100" on the left Y-axis represents the rated voltage of the AC motor. A broken line connecting a point P where lines $V_{11}$ (100%) and $f_1$ (100%) intersect to each other to a point "0", indicates a locus line representing the percentage voltage corresponding to the percentage frequencies $f_1$. And this line is ideally traced on the assumption that the winding resistor of the AC motor 13 is zero. In actuality, however, the winding of the AC motor has some resistance so that the voltage given to the AC motor 13 traces a line $V_{11}$. The torque T by the AC motor 13 in the control method is independent from the input frequency $f_1$ (%) and the motor produces constant torques as is conventionally known in the art. From the facts that ratio $V_{11}$ (%)/$f_1$ (%) (hereinafter simply expressed as $V_{11}/f_1$) is controlled to be almost constant irrespective of the input frequency, and that the torque T is proportional to $(V_{11}/f_1)^2$, it will be seen that the torque T developed is constant independently of the input frequency.

In the above-mentioned method, when the output of the frequency converter 12 includes a high harmonic component, the torque T by the AC motor also includes a high harmonic torque corresponding to the harmonic component. More adversely, the torque T produced is constant independently of the input frequency so that the high harmonic torque remains unchanged even if the number of rotation of the AC motor is small. Some of the members constructing the AC motor 13, the load 15 or the coupling device 14 often have an inherent mechanical vibration frequency or mechanical resonant frequency with the same frequency as the frequency of the high harmonic frequency. If the mechanical resonant frequency and the high harmonic frequency coincide with each other, there is possibility that such members are destroyed. Therefore, it must be avoided that the high harmonic torque frequency is coincident with the inherent vibration frequency. In the case of the load with a complicated construction, such as fans or blowers, it has many members with such inherent mechanical vibration frequency. When it is very difficult to reinforce the mechanical strength of such members or when the inherent frequencies of the members are unknown, the frequency converter 12 must have means for suppressing the high harmonic component and therefore its circuit construction is complicated.

In case where the load 15 has a squared characteristic (the rotating torque is proportional to the square of the number n of rotation and the power required is proportional to $n^3$), such as fans, blowers or pumps, even when the load is operated at a low speed, the AC motor must produce the same torque as that required when it is operated at the rated value. Therefore, it is difficult to save the power consumption.

Accordingly, an object of the invention is to provide a speed control method for an AC motor in which the high harmonic torque may be reduced without reducing the high harmonic components included in the output voltage or output current from a power supply source, and which is well applicable for driving a load with the squared characteristic.

Another object of this invention is to provide a speed control apparatus for AC motors, which can reduce high harmonic torques without reducing high harmonic components in an output voltage or an output current from a frequency converter.

In a speed control method for an AC motor according to the invention, a variable voltage with a variable frequency is applied to an AC motor coupled with a load. At least one frequency region is set up for the variable frequency. The ratio of a percentage input voltage expressed in terms of a percentage of the rated input voltage of the AC motor, to a percentage input frequency expressed in terms of a percentage of the rated input frequency of the AC motor, is set less than unity within the set frequency region.

An AC motor speed control apparatus of this invention includes a frequency converter connected to a power supply source, and an AC motor connected to a load and adapted to receive an output of the frequency converter to control the speed of the AC motor. The output characteristic of the frequency converter includes at least one frequency region of which a ratio between an output voltage of the frequency converter as represented by the percentage of a rated voltage of the AC motor and a frequency of the output voltage of the frequency converter as represented by the percentage of the rated frequency of the AC motor is smaller than 1.

Other objects and features of the invention will be apparent from the following description taken in connection with the accompanying drawings, in which.

Figure 1:
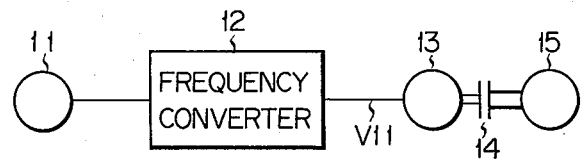
FIG. 1 shows a block diagram of a conventional apparatus for controlling the speed of an AC motor.
Figure 2:
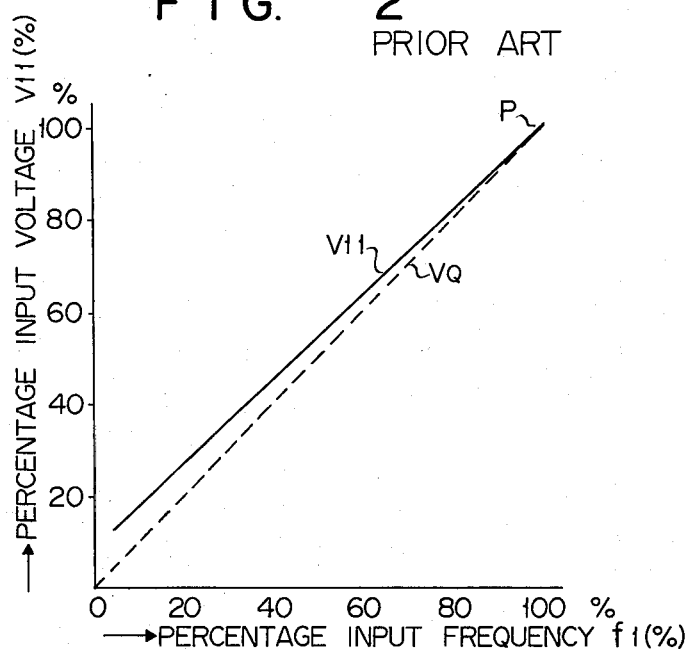
FIG. 2 is a graph for illustrating a conventional speed control method for the AC motor.
Figure 3:
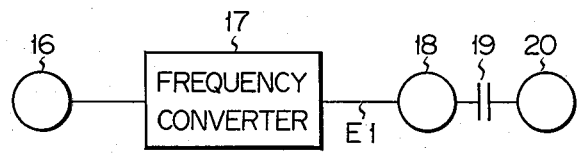
FIG. 3 shows a block diagram of an apparatus for controlling the AC motor speed according to the invention.
Figure 5:
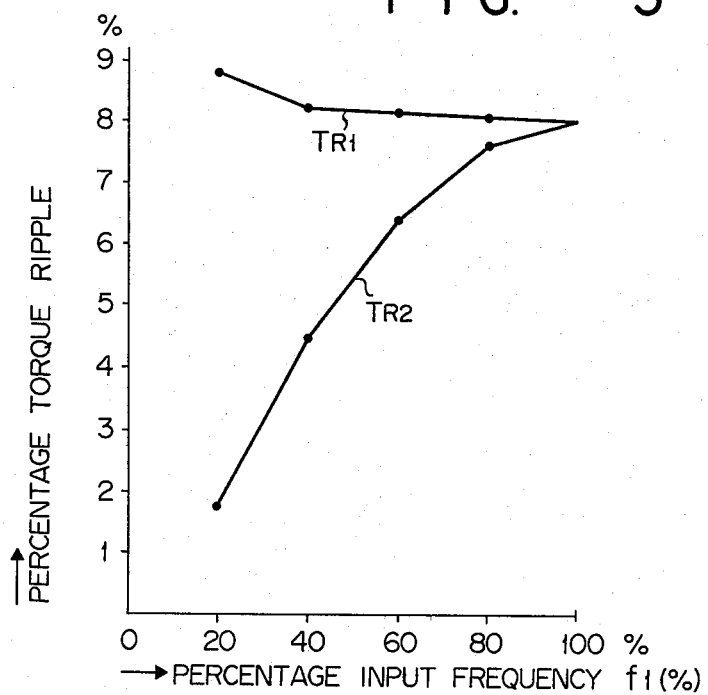
Figure 6:
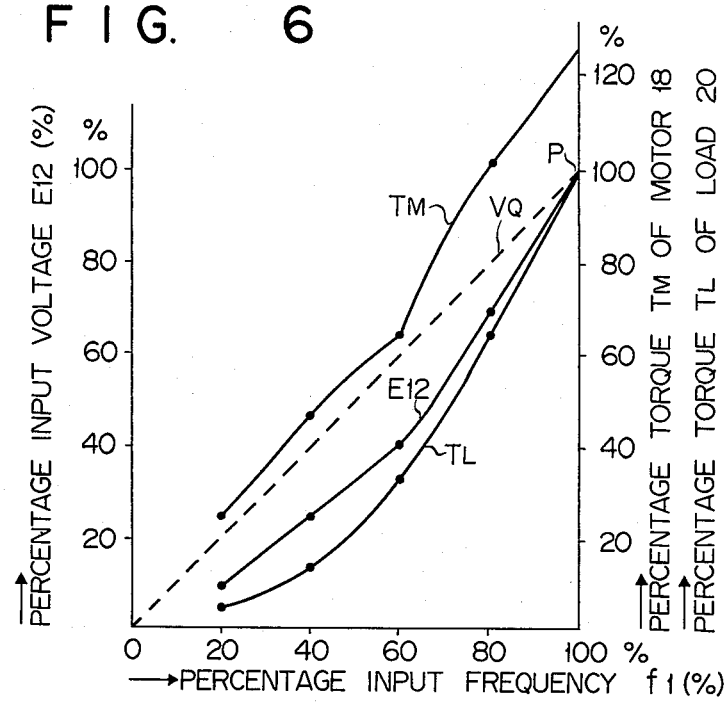
Figure 7:
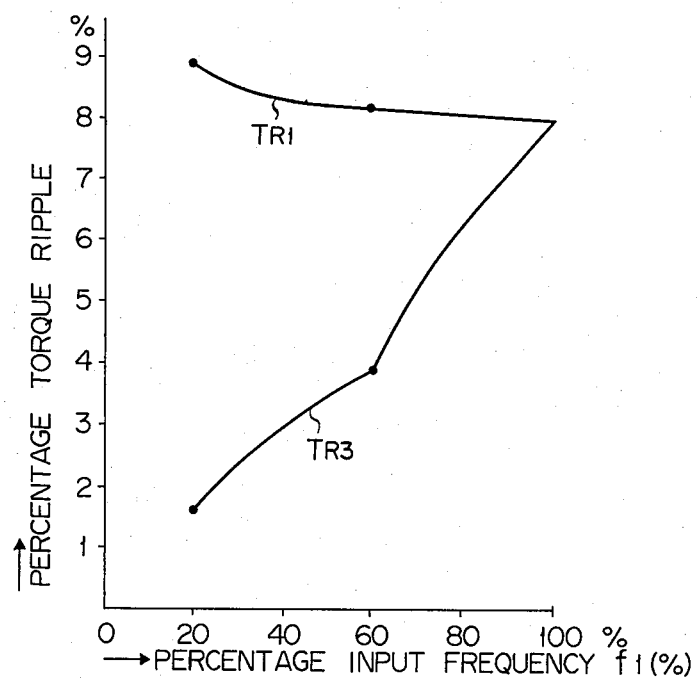
Figure 8:
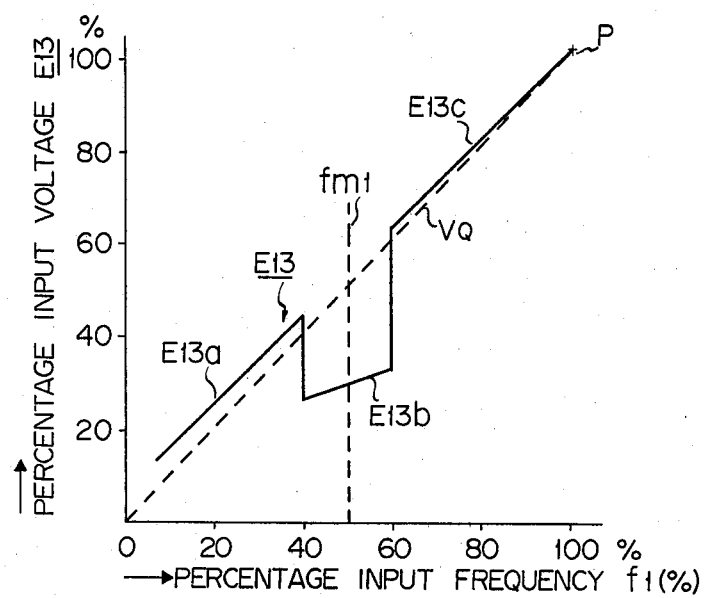
Figure 9:
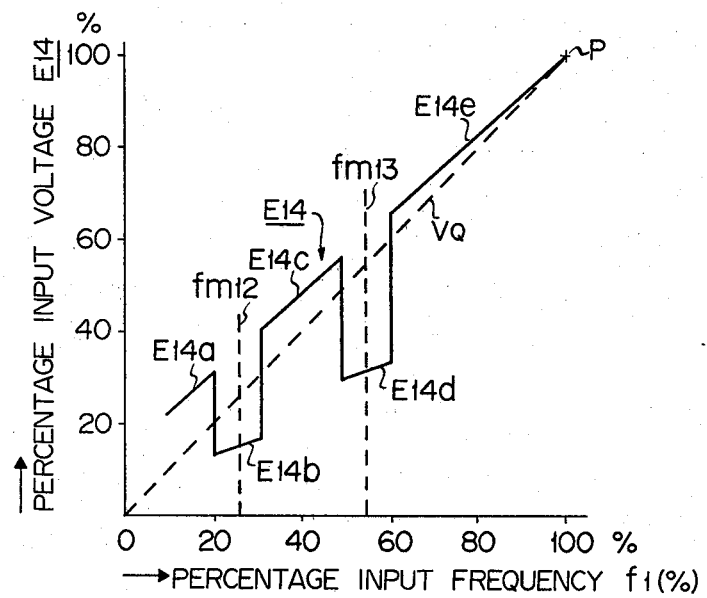
Figure 10:
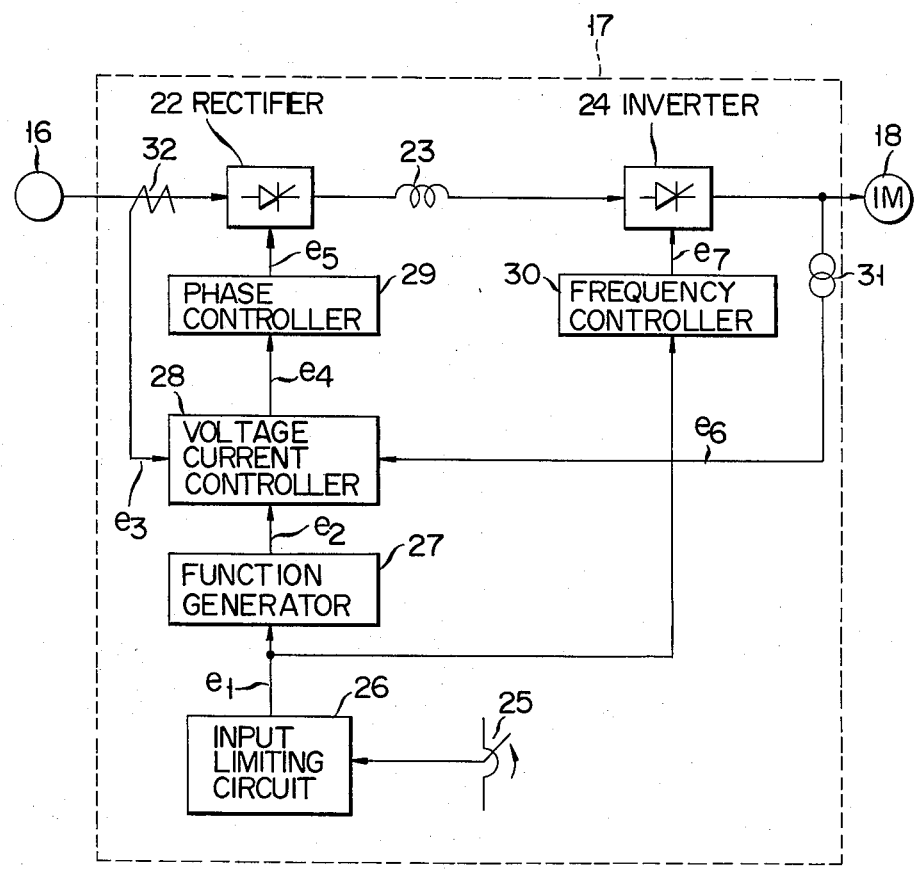
Figure 11:
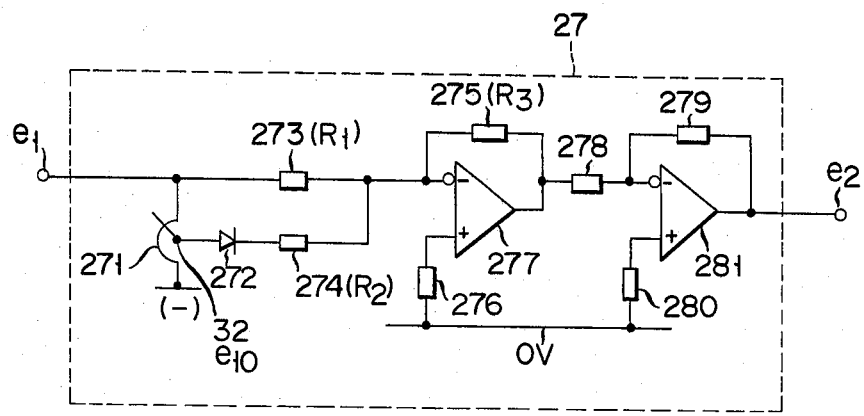

FIG. 5 comparatively shows the torque ripple produced by the AC motor when the conventional speed control method is used and that by the AC motor when the speed control method according to the invention is used;

FIG. 6 shows a graph to illustrate the second embodiment of the speed control method for the AC motor according to the invention;

FIG. 7 comparatively shows the torque ripple produced by the AC motor in the conventional control method in FIG. 2 and that obtained by the AC motor when the control method according to the invention in FIG. 6 is used; and FIGS. 8 and 9 show graphs for illustrating the speed control methods which are third and fourth embodiment according to the invention;

FIG. 10 shows one form of a frequency converter shown in FIG. 3;

FIG. 11 shows one form of a function generator of FIG. 10; and

Figure 12:
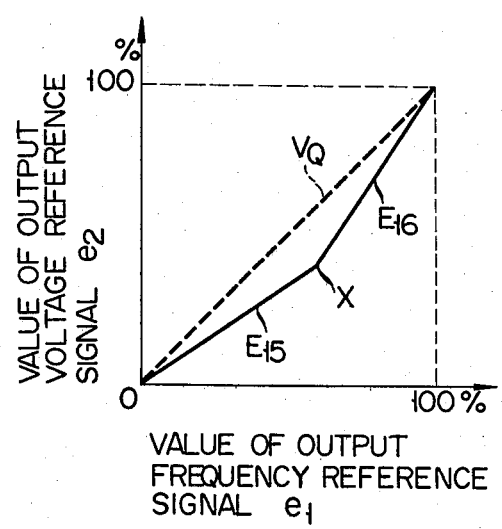

FIG. 12 is a graph representing an output characteristic of the frequency converter of FIG. 10 as obtained by using the function generator of FIG. 11.

In FIG. 3, a frequency converter 17 receives a voltage from a power source 16 with a commercial frequency and converts the voltage into a variable voltage $E_1$ with a variable frequency $f_1$ (which is expressed in terms of a percentage to the rated frequency of an AC motor 18). The conversion is carried out by an adjusting means (not shown). The frequency converter 17 includes a rectifier and an inverter. In the frequency converter 17, a variable resistor controls the inverter to change the frequency of the output from the inverter. The output from the variable resistor is supplied to a function generator and the output from the function generator is applied to a voltage control circuit in the rectifier thereby to control the output voltage of the rectifier. The controlled output voltage from the rectifier is applied to the inverter. With such a circuit construction, when the function generator is designed in compliance with a desired end, a voltage corresponding to the frequency of an output from the inverter can be obtained from the frequency converter by merely adjusting the variable resistor. One example of the frequency converter will be explained later. The voltage $E_1$ from the frequency converter 17 is applied to an AC motor 18. The AC motor 18 is coupled with a load 20 such as a fan, through a coupling apparatus 19.

Figure 4:
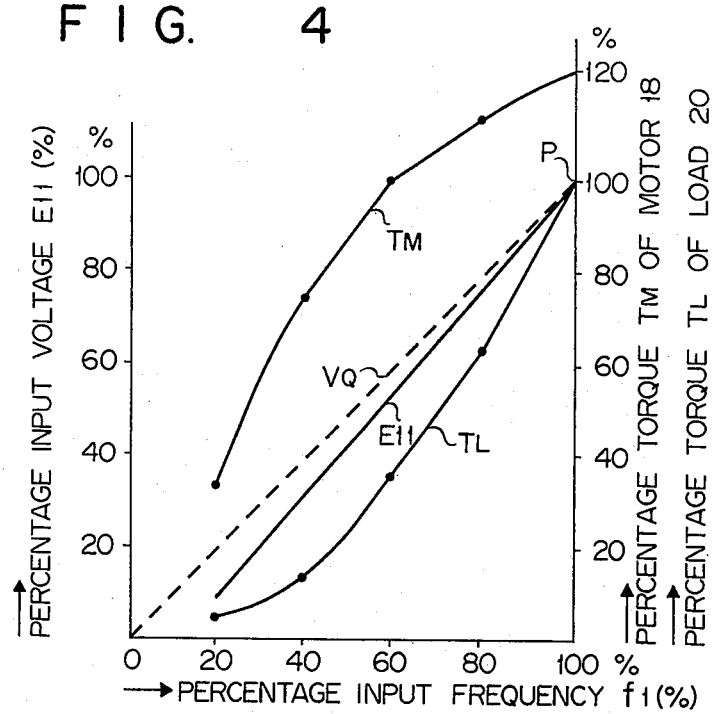
FIG. 4 shows a graph to illustrate a speed control method which is a first embodiment according to the invention.

Reference is made to FIG. 4 in which an X-axis represents a frequency $f_1$ of an input voltage $E_{11}$ to the AC motor 18 which is expressed in terms of % and numeral "100" on the X-axis designates the rated frequency of the AC motor 18. A Y-axis on the left side in the graph represents the input voltage $E_{11}$ to the AC motor 18 which is expressed in terms of % and numeral "100" represents the rated voltage of the AC motor. A dotted line $V_Q$ connecting a crossing point P of the rated input frequency $f_1$ (100%) with the rated input voltage $E_{11}$ (100%) to a point "0", represents a locus line tracing crossing points of the frequencies $f_1$ and the corresponding input voltages $V_Q$. In the present example, assume that a voltage on line $E_{11}$ (%) corresponding to a frequency $f_1$ (%), is applied to the AC motor 18. Another Y-axis on the right side in FIG. 4 represents the percentage torque $T_M$ of the motor 18 and the percentage torque $T_L$ of the load 20 as well. The curve $T_M$ and $T_L$ depicted in the graph in FIG. 4 are traced under a condition that a voltage $E_{11}$ (%) with a frequency $f_1$ (%) is applied to the AC motor 18. This Y-axis is scaled such that the point P corresponds to 100%. Along a line $V_Q$, the ratio $V_Q(\%)/f_1(\%)$ is always unity but, along the line $E_{11}$, the ratio $E_{11}(\%)/f_1(\%)$ is always less than 1 (unity). As seen from the graph, the distance between the lines $V_Q$ and $E_{11}$ is narrower as the frequency $f_1$ becomes larger. The maximum torque $T_M$ developed by the motor 18 is always larger than the maximum torque $T_L$ of the load. The load torque $T_L$ is proportional to the square of the number n of the motor rotation and therefore it is small in the range where the rotational number n is small. Therefore, the maximum torque $T_M$ is larger than the load torque $T_L$ over an entire frequency region. As a consequence, if the ratio $E_{11}/f_1$ is smaller than 1, there is no trouble in practical use.

In FIG. 5, a curve $T_{R1}$ shows a variation of the ripple torque (%) developed by the AC motor 13 when the ratio $V_{11}/f_1$ of the input voltage $V_{11}$ to the AC motor 13 to the input frequency $f_1$ is set along the line $V_{11}$ so as to be always larger than 1, as shown in FIG. 2. A curve $T_{R2}$ shows a variation of the ripple torque (%) developed by the AC motor 18 when the ratio $E_{11}/f_1$ of the input voltage $E_{11}$ to the AC motor 18 to the input frequency $f_1$ is set along the line $E_{11}$ so as to be less than 1, as shown in FIG. 4. As seen from FIG. 5, according to the invention, the ripple torque, i.e. the high harmonic torque, can be considerably reduced as compared to the conventional speed control method for an AC motor. This can readily be understood from the relation $T\alpha (V_{11}/f_1)^2$ referred to in FIG. 2.

In the load such as a fan or a blower, the high harmonic torque is frequently problematic in the region where the input frequency $f_1$ is small, i.e. the number of rotation n is small, rather than in the region where the input frequency $f_1$ is large i.e. the number of rotation n is large. In this case, prevention of the resonance of a specific member of the load in the small rotation-number region is very useful for protecting the specified member of the load. In the invention, the high harmonic torque is reduced in a simple method in which the ratio $E_{11}/f_1$ of the % input voltage $E_{11}$ to % input frequency $f_1$ is set less than 1. Therefore, a complicated circuit construction which is otherwise needed is unnecessary for the frequency converter in order to reduce the high harmonic components in the output voltage or current of the converter 17.

Although the input voltage $E_{11}$ linearly changes with the input frequency $f_1$ in FIG. 4, the inclination of the input voltage curve $E_{12}$ may be changed at a desired frequency region, as shown in FIG. 6. As shown, the input voltage curve $E_{12}$ is changed in its inclination at the 60% frequency point and at the 90% frequency point. In the FIG. 6 case, the maximum torque $T_M$ by the AC motor 18 is larger than the load torque $T_L$ over entire input frequency regions. FIG. 7 comparatively illustrates the high harmonic torque $T_{R1}$ produced when the motor is controlled by the conventional fixed torque control method and the high harmonic torque $TR_3$ produced when the motor is controlled by the control method shown in FIG. 6. In the graph in FIG. 7, the X-axis represents the % input frequency $f_1$ and the Y-axis the % torque ripple. The % torque ripple at the 60% input frequency is 6.2% in FIG. 5 while it is improved to be 4% in FIG. 7. The speed control methods shown in FIGS. 4 and 7 are suitable for a case where the inherent mechanical vibration frequency of a member or members constructing the load is unknown.

When a inherent mechanical vibration frequency of a specific member constructing the AC motor 18 per se, a specific member of the load 20, or a specific member of the coupling means 19 for coupling the AC motor 18 with load 20 is previously known, another control method shown in FIG. 8 or FIG. 9 may be useful.

In FIG. 8, the percentage input frequency $f_1(\%)$ is plotted along the X-axis and the percentage input voltage $E_{13}(\%)$ is plotted along the Y-axis, as in the example shown in FIG. 4 or 6. As shown, a characteristic curve $E_{13}$ is divided into three sections $E_{13a}$, $E_{13b}$ and $E_{13c}$. In these sections, the sections $E_{13a}$ and $E_{13c}$ are set each to have the ratio $E_{13}/f_1$ larger than 1. In this respect, the example is the same as the conventional speed control method. In the section $E_{13b}$ ranging from 40% frequency $f_1$ to 60% frequency $f_1$, the ratio $E_{13}/f_1$ is set much smaller than 1. That is, the ratio $E_{13}/f_1$ at the 50% $f_1$ point is set at approximately 0.6. If the frequency of the high harmonic torque developed by the motor 18 is $f_{m1}$ at the 50% $f_1$ and the inherent vibration frequency of a specific member of the motor 18 or the load 20 is $f_{m1}$, the specific member is completely protected from being damaged due to the resonance phenomenon. The reason for this is that if the $E_{13b}/f_1$ is $\frac{1}{2}$ the torque ripple at the 50% $f_1$ point is approximately $\frac{1}{4}$ when compared with the conventional speed control method. More specifically, also in the region from 40 to 60% frequencies, the frequency of the torque ripple is the same as that by the conventional speed control method, but the amplitude of the ripple torque may be considerably reduced compared with the torque ripple developed by the conventional method. Accordingly, when a specific member of the AC motor 18, the load 20 or the coupling member 19 resonates with the ripple torque frequency, destruction of the specific member is avoidable even if its mechanical strength is small, thus ensuring the safety of operation. In the frequency region from 40 to 60%, the maximum torque $T_M$ developed by the AC motor 18 is also reduced. In the called squared characteristic load in which the load torque changes proportional to the square of the speed n, such as fans, blowers and pumps, it is not required that the torque, be kept constant over the entire region of the percentage frequency $f_1$. Accordingly, even if the speed is controlled along $E_{13}$, there is no trouble in practical use.

Turning now to FIG. 9, there is shown another speed control method according to the invention. In the figure, the X-axis is taken in the direction of the percentage input frequency $f_1(\%)$ and the Y-axis is taken in the direction of the percentage input voltage $E_{14}(\%)$. The input voltage characteristic curve $E_{14}$ is divided into five sections or regions, $E_{14a}$, $E_{14b}$, $E_{14c}$, $E_{14d}$ and $E_{14e}$. The voltage curve $E_{14}$ changes along that by the conventional control method in the regions $E_{14a}$, $E_{14c}$ and $E_{14e}$. The region $14b$ ranges from 20 to 30% frequencies (first region). The ratio $E_{14}/f_1$ at the central frequency in the first region is approximately 0.6 and the frequency of the high harmonic torque generated by the AC motor 18 is $f_{m12}$ at the central frequency. The section $E_{14d}$ ranges from 45 to 60% frequencies (second region). The ratio $E_{14}/f_1$ at the central frequency in the second region is approximately 0.6 and the frequency of the high harmonic torque from the AC motor 18 is $f_{m13}$ at the central frequency. According to the control method, if a member of the motor, coupling means 19 or the load 20 has an inherent mechanical vibration frequency coincident with $f_{m12}$ or $f_{m13}$, it is never destroyed due to resonant phenomenon. That is, the amplitude of the ripple torque developed by the AC motor in the region $E_{14b}$ or $E_{14d}$ is approximately $\frac{1}{4}$ compared with that produced by the conventional method, as already mentioned in FIG. 8.

The arrangement of the frequency converter 17 as shown in FIG. 3 will be explained by way of example by referring to FIGS. 10 and 11.

In FIG. 10, an AC motor 18 is shown as an induction motor. Here, a frequency converter 17 is shown as a current type. A rectifier 22 receives the output of an AC power source 16 for DC conversion. The DC output of the rectifier is supplied through a smoothing reactor 23 to an inverter 24. The inverter causes a DC input to be converted to an AC output which in turn is supplied to the motor 18. A speed reference setter (a setter for setting a signal of an output frequency of the inverter 24) is provided. The output of the setter 25 is supplied to an input limiting circuit 26. The setter 25 is constructed of a variable resistor. The input limiting circuit 26 makes the rise of the input signal relatively small and produces an output frequency reference signal $e_1$. A function generator 27 receives the output frequency reference signal $e_1$ to produce an output voltage reference signal (or an output voltage setting signal) $e_2$. A voltage/current controller 28 is provided to control a voltage or a current supplied to the AC motro 18. The controller 28 receives an output voltage reference signal $e_2$ to generate a control signal $e_4$. When the control signal $e_4$ is supplied to a phase controller 29, the controller 29 delivers a control signal $e_5$ for determining the conduction starting angle of an element constituting the rectifier 22, to the rectifier 22. The output reference signal $e_1$ is supplied to the frequency controller 30. An output $e_7$ of the frequency controller controls the output frequency of the inverter 24. An output voltage signal $e_6$ is supplied from the output of the inverter 24 through the voltage detector 31 to the voltage current controller 28 and a signal $e_3$ representing an input current value to the rectifier 22 through a current transformer 32 is also supplied to the voltage current controller 28. The input signals $e_2$, $e_6$, $e_3$ are compared in the voltage controller 28 and a control signal $e_4$ is produced to control the phase controller 29.

A relation of the output signal $e_2$ to the input signal $e_1$ of the function generator 27 can be arbitrarily set. In consequence, a ratio V/F of an output voltage V of the inverter 24 to an output frequency F can be arbitrarily set. According to this invention, therefore, a frequency range having a ratio %V/%F of smaller than 1 can be set.

The function generator 27 will now be explained below by way of example by referring to FIGS. 11 and 12. In FIG. 11, 271 shows a variable resistor; 272, a diode; 273 to 276 and 278 to 280, resistors; and 277, 281, operational amplifiers. $R_1$ represents a resistive value of a resistor 273, $R_2$ a resistive value of a resistor 274 and $R_3$ a resistive value of a resistor 275. When the lever of the variable resistor 271 is clockwise rotated, a voltage $e_{10}$ on a point 32 is shifted from a negative to a positive voltage. During the time period in which the voltage $e_{10}$ is in the negative voltage, the diode 272 is in the non-conducting state and thus an operational amplifier 277 serves as a proportional amplifier having a gain of $-R_3/R_1$. The output signal of the operational amplifier 277 is fed to a proportional amplifier, comprising the resistors 278, 279, 280 and operational amplifier 281 and having a gain of $-1$, to obtain an output voltage reference signal $e_2$ having a value of $R_3/R_1$ $e_1$.

In FIG. 12, characteristic curves $E_{15}$, $E_{16}$, $V_Q$ representing a relation of the output frequency of the inverter 24 to an output voltage is shown with the output frequency reference signal $e_4$ as an abscissa and the output voltage reference signal $e_2$ as an ordinate. The line $V_Q$ is a line, as already explained above, corresponding to $\%e_2/\%e_1 = 1$. A line $E_{15}$ is obtained during the period in which a voltage on the point 32 is negative. When the lever of the variable resistor 271 is further clockwise rotated, the voltage on the point 32 becomes positive and is gradually increased. At this time the diode 272 is turned ON and the resistive value of an input resistor of the operational amplifier 277 becomes a parallel resistive value of the resistors 273 and 274. In consequence, the operational amplifier 277 acts as a proportional amplifier having a gain of $-(R1 \cdot R2)/(R1+R2)R3$. The output of the amplifier 277 is fed to the proportional amplifier, comprising of the resistors 278, 279 and 280 and operational amplifier 281 and having a gain of $-1$, where the output frequency reference signal $e_1$ is amplified $(R1 \cdot R2 \cdot R3)/(R1+R2)$ times to produce an output frequency reference signal $e_2$. An output characteristic curve obtained during the time in which a voltage $e_{10}$ on the point 32 is positive is indicated by $E_{16}$ in FIG. 12. A position of a folding point X can be determined dependent upon how the variable resistor 271 is set and the inclination of the respective lines $E_{15}$ and $E_{16}$ can be varied by changing the resistive values of the resistors 273, 274 and 275. Although explanation has been given to the case where the folding point is present on the single point X, two or more folding points can be provided. The function generator 27 can be designed such that, for example, a voltage line $E_{13}$ as shown in FIG. 8 or a voltage line $E_{14}$ as shown in FIG. 9 can be obtained.

What is claimed is:

1. A speed control method for controlling the speed of an AC motor coupled with a load by supplying a variable voltage with a variable frequency to the AC motor comprising the steps of:

setting up at least two frequency regions for the variable frequency;

setting the ratio of a percentage input voltage expressed in terms of a percentage of the rated input voltage to the AC motor, to a corresponding percentage input frequency expressed in terms of a percentage of the rated input frequency to the AC motor, less than unity within one of the frequency regions set in the first step, such that the high frequency torque ripple in said one of said set frequency regions is decreased; and setting said ratio of percentage input voltage to percentage input frequency in at least a second frequency region to a ratio higher than that of said one of said frequency regions to increase motor torque in said second frequency region.

2. A speed control method according to claim 1, in which said load is of a type in which the rotating torque decreases as the number of rotation decreases.

3. A speed control method according to claim 1, in which said one frequency region includes a frequency range where the frequency of a high harmonic torque developed by the AC motor is coincident with the inherent vibration frequency of a specific member of the AC motor, said specific member constituting part of said AC motor and having an inherent vibration frequency within the frequency range of said high harmonic torque in said one frequency region set.

4. A speed control method according to claim 1, in which said one frequency region includes a frequency range where the frequency of a high harmonic torque developed by the AC motor is coincident with the inherent vibration frequency of a specific member of the load, said specific member constituting part of said load and having an inherent vibration frequency range within the range of said high harmonic torque in said one frequency region set.

5. A speed control method according to claim 1, in which said one frequency region includes a frequency range where the frequency of a high harmonic torque developed by the AC motor is coincident with the inherent vibration frequency of a specific member of coupling means for coupling the AC motor with the load, said specific member constituting part of said coupling means and having an inherent vibration frequency within the frequency range of said high harmonic torque in said one frequency region set.

6. A speed control apparatus for AC motors, including a frequency converter connected to a power supply source and an AC motor connected to a load and to receive an output of the frequency converter so that the speed of the AC motor is controlled, in which the output characteristic of said frequency converter includes at least a first frequency range and a second frequency range of which the value of a ratio between an output voltage of said frequency converter as represented by the percentage of a rated voltage of said AC motor and a frequency of an output voltage of said frequency converter as represented by the corresponding percentage of the rated frequency of said AC motor is smaller than 1 in said first frequency range and said ratio of output voltage to frequency in said second frequency range is higher than that of said first range, whereby the high frequency torque ripple in said first range is relatively decreased and the motor torque output in said second range is relatively increased.

7. A speed control apparatus according to claim 6, in which said frequency converter comprises a rectifier for converting an AC input supplied to said frequency converter into a voltage-variable DC output, an inverter for converting the DC output into a frequency-variable AC output for supply to said AC motor, an output frequency setter for setting the output frequency of said inverter, means for receiving an output of said output frequency setter to control the output frequency of said inverter, a function generator for receiving the output of said output frequency setter to control an output voltage of said rectifier, and means for receiving said output voltage setting signal from said function generator to control an output voltage of said rectifier.

* * * * *